United States Patent
Yuan et al.

(10) Patent No.: US 11,067,455 B2
(45) Date of Patent: Jul. 20, 2021

(54) REAL-TIME TEMPERATURE MEASUREMENT FOR ELECTRICAL CONDUCTORS

(71) Applicant: 3M INNOVATIVE PROPERTIES COMPANY, St. Paul, MN (US)

(72) Inventors: Sihua Yuan, Shanghai (CN); Justin M. Johnson, Hudson, WI (US); Ryan D. Erickson, Roseville, MN (US); Christopher D. Sebesta, Brooklyn, NY (US); Zheng Huang, Shanghai (CN); Jia Hu, Mounds View, MN (US); Tongyong Li, Shanghai (CN); Gaofei Guo, Shanghai (CN); Tao Yang, Beijing (CN); Qihong Nie, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 381 days.

(21) Appl. No.: 16/064,745

(22) PCT Filed: Dec. 21, 2015

(86) PCT No.: PCT/CN2015/098041
§ 371 (c)(1),
(2) Date: Jun. 21, 2018

(87) PCT Pub. No.: WO2017/107000
PCT Pub. Date: Jun. 29, 2017

(65) Prior Publication Data
US 2019/0003901 A1    Jan. 3, 2019

(51) Int. Cl.
*G01K 7/34* (2006.01)
*G01K 1/143* (2021.01)
(Continued)

(52) U.S. Cl.
CPC ............... *G01K 7/34* (2013.01); *G01K 1/143* (2013.01); *G01K 1/16* (2013.01); *G01K 7/24* (2013.01); *G01K 7/32* (2013.01); *H01R 4/48* (2013.01)

(58) Field of Classification Search
CPC .. G01K 7/32; G01K 7/34; G01K 7/24; G01K 1/16; G01K 1/143; H01R 4/48
See application file for complete search history.

(56) References Cited

U.S. PATENT DOCUMENTS

| | | | | |
|---|---|---|---|---|
| 4,635,055 A | * | 1/1987 | Fernandes | G01K 1/024 323/357 |
| 4,746,241 A | * | 5/1988 | Burbank, III | G01K 1/024 403/344 |

(Continued)

FOREIGN PATENT DOCUMENTS

| | | |
|---|---|---|
| CN | 2569118 Y | 8/2003 |
| CN | 1982858 | 6/2007 |

(Continued)

OTHER PUBLICATIONS

Wayback Machine., Wikipedia-Beryllium_oxide., "https://en.wikipedia.org/wiki/Beryllium_oxide" Sep. 17, 2014 (Year: 2014).*

(Continued)

*Primary Examiner* — Yoshihisa Ishizuka
(74) *Attorney, Agent, or Firm* — Gregg H. Rosenblatt

(57) ABSTRACT

A temperature-sensing apparatus for sensing the temperature of an electrical conductor (31), comprising a sensor frame (210) including a frame body (2101) and a channel (2102) adapted to accommodate the electrical conductor (31). At least a portion of a temperature sensor is received in a chamber (2103) of the sensor frame (210). At least a portion of a thermal contact member is disposed between the electrical conductor (31) and the temperature sensor and configured to enhance thermal-contact therebetween. At (Continued)

least a portion of the thermal contact member is radially pressable against the electrical conductor (31).

14 Claims, 9 Drawing Sheets

(51) Int. Cl.
*G01K 1/16* (2006.01)
*H01R 4/48* (2006.01)
*G01K 7/24* (2006.01)
*G01K 7/32* (2006.01)

(56) References Cited

U.S. PATENT DOCUMENTS

| | | | | |
|---|---|---|---|---|
| 6,278,379 | B1* | 8/2001 | Allen | B60C 23/0408 340/870.16 |
| 7,059,769 | B1* | 6/2006 | Potega | G01K 7/223 374/185 |
| 9,304,047 | B2 | 4/2016 | Huang et al. | |
| 2011/0057058 | A1 | 3/2011 | McAlister | |
| 2014/0256188 | A1* | 9/2014 | Manahan | H02J 5/005 439/660 |
| 2015/0280483 | A1* | 10/2015 | Golko | H02J 50/90 320/108 |

FOREIGN PATENT DOCUMENTS

| | | |
|---|---|---|
| CN | 201364205 Y | 12/2009 |
| CN | 101403640 | 11/2010 |
| CN | 203100777 U | 7/2013 |
| CN | 102175341 | 11/2013 |
| CN | 204269254 | 4/2015 |
| CN | 204375996 U | 6/2015 |
| EP | 0 125 050 A1 | 11/1984 |
| JP | 61-219841 A | 9/1986 |
| JP | 01-172714 A | 7/1989 |
| JP | 4980824 | 3/2009 |
| JP | 2010-107477 | 5/2010 |
| WO | WO 2014-176784 | 11/2014 |
| WO | WO 2015-035568 | 3/2015 |
| WO | WO 2016-065574 | 5/2016 |
| WO | WO 2016-106558 | 7/2016 |

OTHER PUBLICATIONS

"Aluminum Nitride—Machinable Ceramic—online catalog source—supplier of research", The Goodfellow Group of Companies, [on line], [retrieved from internet on Aug. 21, 2018], URL < http://www.goodfellowusa.com/A/Aluminum-Nitride-Machinable-Ceramic.html >, 2 Pages.
"Ceramic Finishing Capabilities", Coorstek, [on line], [retrieved from internet on Aug. 21, 2018], URL <http://www.coorstek.com/services/Brazing-Bonding-Joining.php>, 7 Pages.
"Ceramic to Metal Bonding", S-Bond Technologies, [on line], Presented in internet on Apr. 4, 2011 [retrieved from internet on Aug. 21, 2018], URL <http://www.s-bond.com/blog/2011/04/04/ceramic-metal-bonding-part-one>.
"Were these the materials you were looking for?", Precision Ceramics, [on line], [retrieved from internet on Aug. 21, 2018], URL <http/www.precision-ceramics.co >, 5 Page.
International Search Report for PCT International Application No. PCT/CN2015/098041, dated Sep. 20, 2016, 5pgs.
Supplemental EP Search Report for EP15911000.6, dated Jul. 8, 2019, 2 pp.
Search Report for CN2015800854866, dated Jul. 11, 2019, 2 pp.

* cited by examiner

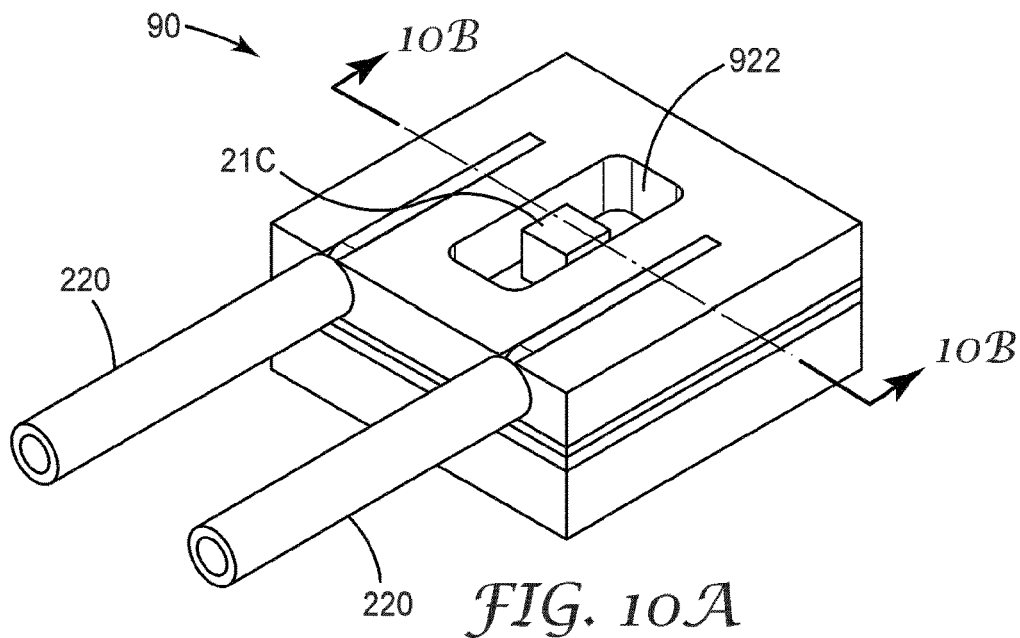
FIG. 10A
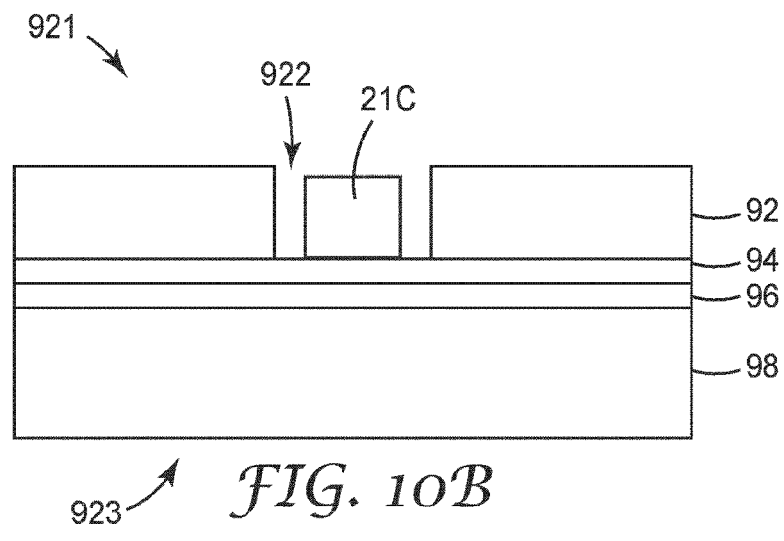
FIG. 10B
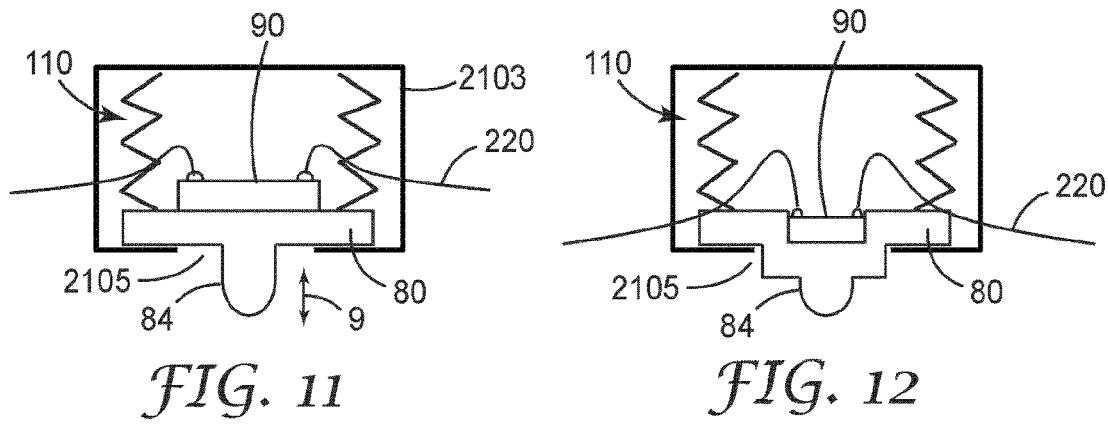
FIG. 11
FIG. 12

REAL-TIME TEMPERATURE MEASUREMENT FOR ELECTRICAL CONDUCTORS

TECHNICAL FIELD

The present disclosure relates to systems and methods for monitoring temperature of an electrical conductor in real time, and in particular, to systems and methods for monitoring temperature of an electrical conductor of an electrical power cable in a power distribution system.

BACKGROUND

Medium and high voltage power distribution systems play an important role in modern society. Safety and security are always considerable factors for the "health" of power distribution system. Accordingly, there should be a technology that enables monitoring of the "health" of the power distribution system.

In a power distribution system such as a medium or high voltage power distribution system, the temperature of conductors of electrical cables may increase as currents carried by the cables increase. Accordingly, the "health" of such system can be assessed by monitoring the temperature of the on-line electrical conductor, for example, at the cable splices or the junctions, which may be the weak points, in such a system. Usually, normal currents flowing through the cable splices or the junctions may create a temperature of up to, for example, about 90° C. If the temperatures of the cable splices or the junctions were to increase beyond that, it could be an indication that something may be wrong in this power distribution system. On the other hand, it is also useful to know if the existing power distribution system is at maximum current carrying capacity, to know if additional power can be reliably distributed with the existing system, or, to know if additional infrastructure expenditures are needed.

SUMMARY

On-line power cables, as well as cable splices and junctions, for example, in medium or high voltage power distribution systems are typically insulated and protected by a number of insulative and (semi)conductive layers and/or are commonly buried underground or are positioned high overhead. There is a desire to directly monitor or measure the temperature of on-line electrical conductors in real time, for example, directly at the cable splices or the junctions during operation with a minimum thermal delay.

Briefly, in one aspect, the present disclosure describes systems and methods for directly sensing, measuring, or monitoring the temperature of an electrical conductor of a power cable in real time. A temperature-sensing apparatus for sensing the temperature of an electrical conductor is provided. The apparatus includes a sensor frame, a temperature sensor, and a thermal contact member configured to enhance thermal communication between the temperature sensor and the electrical conductor. The sensor frame includes a frame body and a channel adapted to accommodate the electrical conductor elongated along an axial direction. The frame body includes a chamber adjacent the electrical conductor. At least a portion of the temperature sensor is received in the chamber. At least a portion of the thermal contact member is disposed between the electrical conductor and the temperature sensor and configured to enhance thermal communication therebetween. At least a portion of the thermal contact member is configured to be radially pressable against an outer surface of the electrical conductor.

In another aspect, an electrical cable assembly is provided. The assembly includes an electrical conductor enclosed in a (semi)conductive layer, and one or more of temperature-sensing apparatuses described herein. The temperature-sensing apparatus includes a sensor frame, a temperature sensor, and a thermal contact member configured to enhance thermal communication between the temperature sensor and the electrical conductor. The sensor frame includes a frame body and a channel adapted to accommodate the electrical conductor elongated along an axial direction. The frame body includes a chamber adjacent the electrical conductor. At least a portion of the temperature sensor is received in the chamber. At least a portion of the thermal contact member is disposed between the electrical conductor and the temperature sensor and configured to enhance thermal communication therebetween. At least a portion of the thermal contact member is configured to be radially pressable against the electrical conductor. The temperature-sensing apparatuses are distributed along the electrical conductor and configured to sense a temperature distribution of the electrical conductor.

Various unexpected results and advantages are obtained in exemplary embodiments of the disclosure. One such advantage of exemplary embodiments of the present disclosure is that the thermal contact member described herein is capable of radially pressing against the electrical conductor. This allows the channel of a sensor frame to accommodate electrical conductors having different sizes, while providing good thermal communication between a temperature sensor and the electrical conductors via the thermal contact member. The embodiments described herein can effectively reduce thermal delay induced by possible air gap between the electrical electrode and the temperature sensor, and provide direct, real-time temperature measurement for electrical conductors which is more robust, accurate, and reliable.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 10A is a perspective side view of a circuit board including a temperature sensitive capacitor, according to one embodiment.

FIG. 10B is a cross-section view of the circuit board of FIG. 10A along a line 10B-10B.

FIG. 11 is a cross-section view of a temperature-sensing apparatus, according to one embodiment.

FIG. 12 is a cross-section view of a temperature-sensing apparatus, according to another embodiment.

Figure 1:
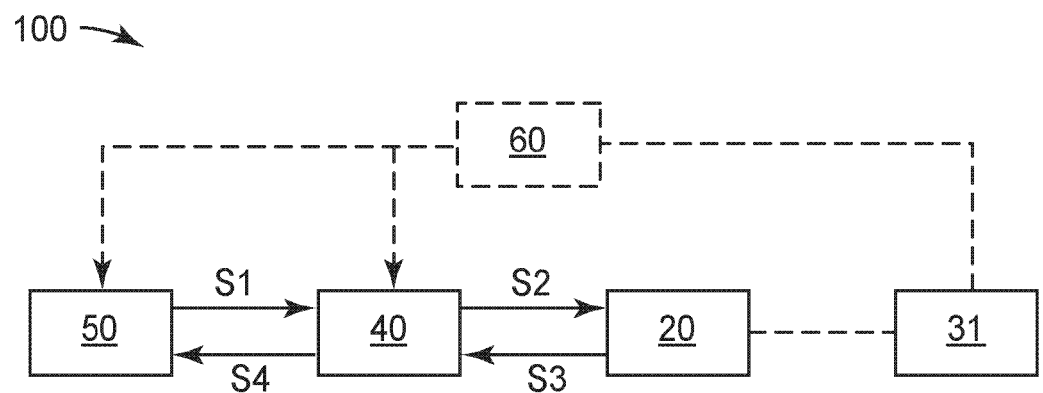
FIG. 1 is a schematic block diagram of a system for monitoring temperature of an electrical conductor, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

The present disclosure provides embodiments of systems and methods for monitoring a temperature of an electrical conductor of, for example, medium or high voltage (e.g., >1 kV or >10 kV) power cables. It may be particularly useful to perform such monitoring by means of a "passive" apparatus, by which is meant an apparatus that does not require an internal power source (e.g., battery) and that does not need to be physically connected to an external power source. One type of passive apparatus that can find use in such applications relies on an LC circuit (i.e., an inductive-capacitive circuit). An appropriately designed LC circuit can exhibit a resonant frequency, which resonant frequency can be monitored (whether continuously or discontinuously) without necessarily requiring any wire connection to be made to the apparatus, as will be appreciated by the skilled person. When such an apparatus uses a temperature sensitive capacitor that is placed in thermal communication or contact with a portion of a power cable, a change in temperature of that portion of the power cable can cause the temperature of the temperature sensitive capacitor to change commensurately. This temperature change can change the resonant frequency of the LC circuit, which can be detected and used to infer the temperature of that portion of the power cable.

FIG. 1 is a schematic diagram of a system 100 for monitoring a temperature of an electrical conductor 31 according to one embodiment. The system 100 includes a passive inductive unit 20, a transceiver unit 40, and a control unit 50. The passive inductive unit 20 is configured to include at least one temperature sensitive capacitor as described hereinafter. The temperature sensitive capacitor has a characteristic parameter that varies with temperature and is in thermal contact with the electrical conductor 31. In some embodiments, the temperature sensitive capacitor is in thermal contact with the outer surface of the electrical conductor 31 via one or more thermal contact members described further below.

In some embodiments, the passive inductive unit 20 can have a resonance frequency and/or Q value that varies with the temperature of the electrical conductor 31. The transceiver unit 40 can be electromagnetically coupled to the passive inductive unit 20, and send out a signal representing the resonance frequency and/or Q value of the inductive unit 20. The control unit 50 can communicate with the transceiver unit 40 to ascertain the signal representing the resonance frequency and/or Q value, and to determine a value of the temperature of the electrical conductor 31 based on the ascertained signal representing the resonance frequency and/or Q value. In some embodiments, the system 100 may further include an optional central monitoring unit. The optional central monitoring unit can communicate with the control unit 50 wirelessly (e.g., through mobile network) or through wires to receive the determined value of the temperature of the electrical conductor 31 and make decisions accordingly.

In some embodiments, during operation, if there is a need to monitor the temperature of the electrical conductor 31, the control unit 50 may send out an instruction signal S1 to the transceiver unit 40. Once the transceiver unit 40 receives the instruction signal S1, it then sends out an excitation signal S2 to the inductive unit 20. The excitation signal S2 can induce the inductive unit 20 to oscillate. The transceiver unit 40 can detect an oscillation signal S3 from the inductive unit 20 and then send out a feedback signal S4 to the control unit 50. The oscillation signal S3 and the feedback signal S4 contain the information representing the resonance frequency and/or Q value of the inductive unit 20, which can be varied with the temperature of the electrical conductor 31. The control unit 50 can determine a value of the temperature of the electrical conductor 31 based on the ascertained feedback signal S4.

In some embodiments, the system 100 may further include an optional energy harvesting unit 60. The energy harvesting unit 60 can be adapted to harvest electrical power from the electrical conductor 31 when an AC current flows through the electrical conductor 31 and to supply the harvested electrical power to the transceiver unit 40 and/or the control unit 50.

Figure 2:
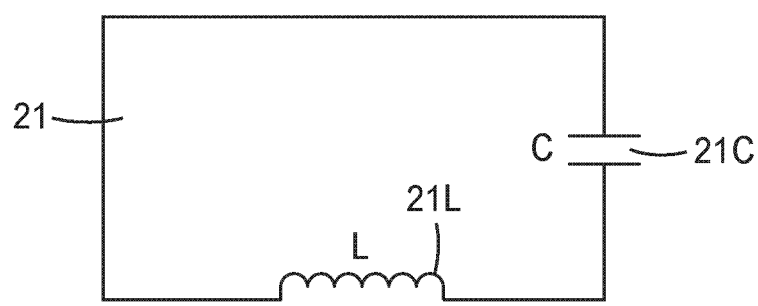
FIG. 2 is a schematic circuit diagram of an LC loop of a system for monitoring temperature of an electrical conductor, according to one embodiment.

In one embodiment, the inductive unit 20 can include an inductor-capacitor (LC) loop 21 as shown in FIG. 2. The LC loop 21 includes a temperature sensitive capacitor 21C and an inductor 21L electrically connected in series, e.g. via a wire. The temperature sensitive capacitor 21C has a capacitance that varies with temperature. In this instance, during practical application, the temperature sensitive capacitor 21C can be in thermal contact or in direct contact with the outer surface of the electrical conductor 31 of FIG. 1. The inductor 21L can be any type of inductor including, for example, an inductive coil, a printed antenna, etc. It can be understood that the LC loop 21 may include one or more capacitors and/or one or more inductors.

The resonance frequency $f_r$ of the LC loop 21 can be calculated according to the formula (1) given as below:

$$f_r = \frac{1}{2\pi\sqrt{LC}}, \quad (1)$$

in which L denotes a value of inductance, e.g. the inductance of the inductor 21L; C denotes a value of capacitance, e.g. the capacitance of the capacitor 21C.

In actuality, the LC loop 21 may have some resistive, dissipative, and/or absorptive loss, which can be modeled as a single small series resistance, Rs. The Q value of such an LC loop 21 can be calculated according to the formula (2) given below:

$$Q = \frac{\omega_0 L}{R_s} = \frac{1}{\omega_0 C R_s}, \quad (2)$$

where $\omega_0=2\pi f_r$, and where $f_r$ is the resonant frequency.

It can be seen that when the inductance or the capacitance of the LC loop 21 is changed, the resonance frequency $f_r$ and Q value can change accordingly. In the embodiments as shown in FIG. 2, the capacitor 21C is temperature sensitive and is configured to be in thermal contact with the electrical conductor 31. The temperature of the capacitor 21C can vary with the change in the temperature of the electrical conductor 31, thereby causing a change in the capacitance of the capacitor 21C. Consequently, the resonance frequency $f_r$ and the Q value of the LC loop 21 can vary with different temperature of the electrical conductor 31. It is to be understood that the inductor 21L can be in thermal contact with the electrical conductor 31 and have its inductance varying upon the temperature change of the electrical conductor 31.

In some embodiments, a series of coupled inductive unit and transceiver unit such as, for example, the inductive unit 20 and the transceiver unit 40 of FIG. 1, can be distributed along an electrical conductor of a power cable such as the electrical conductor 31. Each of the coupled inductive units and transceiver units can measure a local temperature of a portion of the electrical conductor that is in thermal contact with the respective inductive unit (e.g., the inductive unit 20). The measured local temperatures can be received by the control unit 50 to determine a temperature distribution along the electrical conductor.

Figure 3:
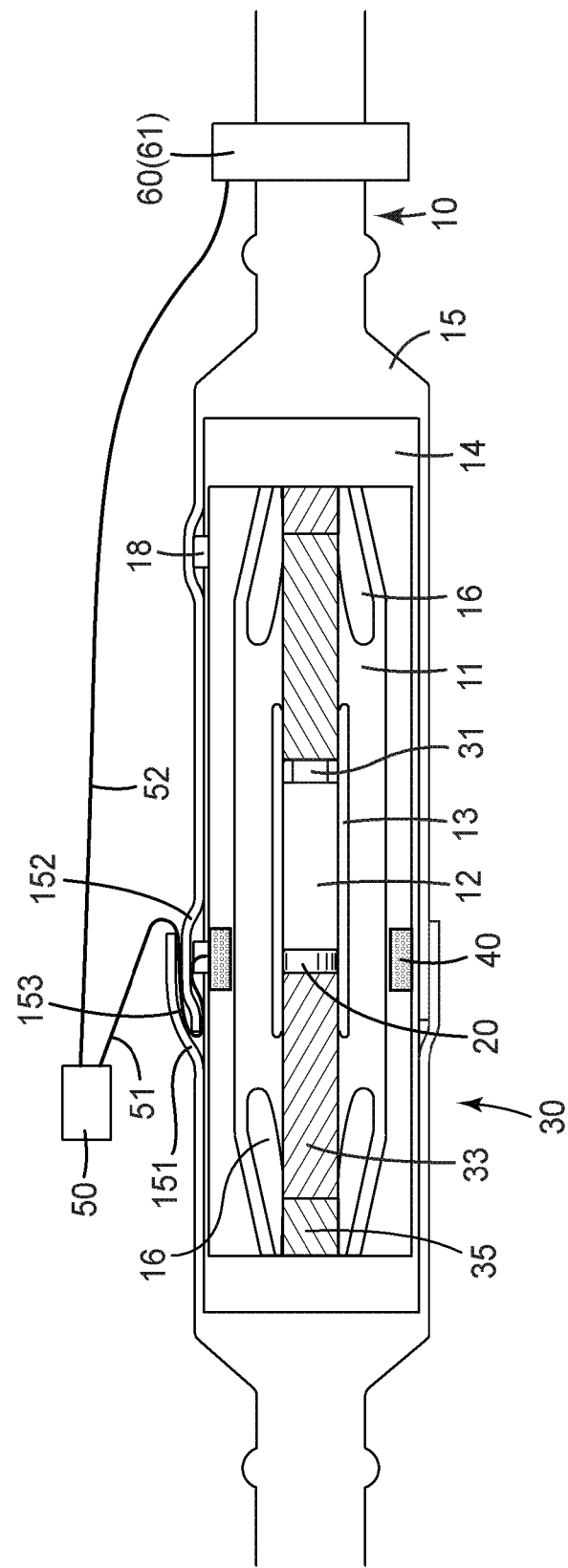
FIG. 3 is a partial cut-away schematic view of application of a system for monitoring temperature of an electrical conductor in a cable splice assembly, according to one embodiment.

FIG. 3 illustrates application of the system 100 of FIG. 1 including the passive inductive unit 20, the transceiver unit 40, and the control unit 50 for monitoring or measuring temperature of the electrical conductor 31, for example enclosed in a cable splice assembly 30, according to one embodiment.

In the cable splice assembly 30, two sections of an electrical cable 10 are spliced. Each section of the electrical cable 10 includes the electrical conductor 31, an insulation layer 33, and a (semi)conductive layer 35. The insulation layer 33 and the (semi)conductive layer 35 enclose the electrical conductor 31. A connector 12 concentrically surrounds the spliced electrical conductors 31. A first (semi)conductive (or electrode) layer 13, in this case a metallic layer, concentrically surrounds the spliced electrical conductors 31 and the connector 12, forming a shielding Faraday cage around the connector 12 and the electrical conductors 31. In some embodiments, "(semi)conductive" indicates that the layer may be semi-conductive or conductive, depending on the particular construction. An insulating layer 11 (containing geometric stress control elements 16) surrounds the first (semi)conductive layer 13. The foregoing construction is placed inside a second (semi)conductive layer 14, in this case a metallic housing, which functions as a shield and ground layer. A resin can be poured into the metallic housing 14 through one of the ports 18 to fill in the area around insulating layer 11. A shrinkable sleeve layer 15 serves as an outermost layer.

In this embodiment, portions of the electrical conductors 31 are covered by the connector 12 and then are enclosed by the first (semi)conductive layer 13, the insulating layer 11, the second (semi)conductive layer 14, and the shrinkable sleeve layer 15. In this embodiment, the shrinkable sleeve layer 15 includes two overlapping sections 151 and 152 to leave a passage 153 between the overlapping portions. The passage 153 is from the outside of the shrinkable sleeve layer 15 through the port 18 on the second (semi)conductive layer 14 to the inside of the second (semi)conductive layer 14.

As shown in FIG. 3, the passive inductive unit 20 is positioned adjacent to one of the electrical conductors 31 and inside the first (semi)conductive layer 13. Preferably, a portion of the electrical conductor 31 is exposed between the insulation layer 33 of the electrical cable 10 and the connector 12, and the passive inductive unit 20 may be positioned around the exposed portion of the electrical conductor 31. More detailed description about the position of the passive inductive unit 20 will be given hereinafter with reference to FIG. 6.

Figure 4:
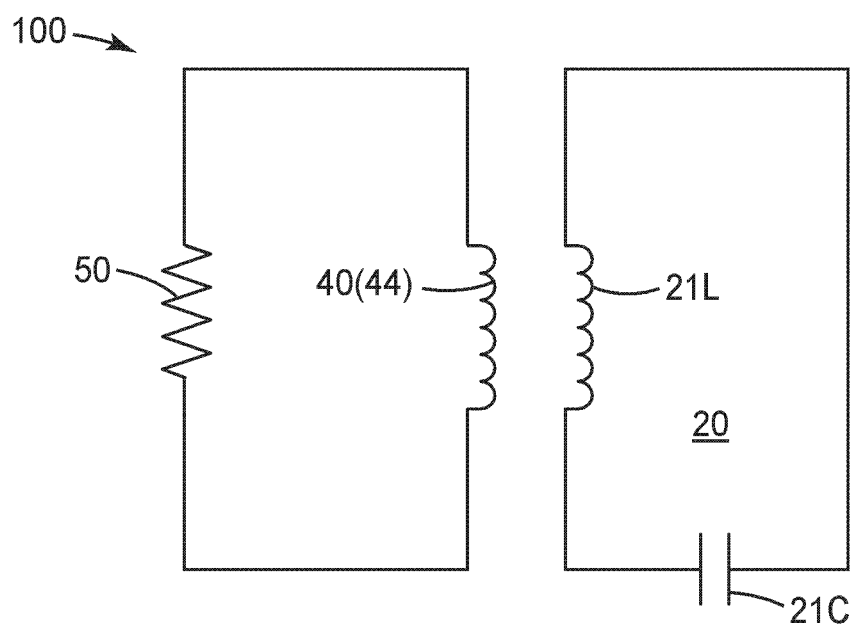
FIG. 4 is a schematic circuit diagram of a system for monitoring temperature of an electrical conductor, according to one embodiment.

The transceiver unit 40 is positioned outside the first (semi)conductive layer 13 and inside the second (semi) conductive layer 14, i.e. between the first (semi)conductive layer 13 and the second (semi)conductive layer 14. In one embodiment as shown FIG. 4, the transceiver unit 40 includes an inductor 44 that can include any type of inductor including, for example, an inductive coil, a printed antenna, etc. The inductor 44 can be positioned around the insulating layer 11 of FIG. 3. In some embodiments, the inductor 44 and the inductor 21L of the passive inductive unit 20 (see FIG. 2) can be located in a same cross section, so as to improve the electromagnetic coupling. More detailed description about embodiments of the transceiver unit 40 and its positioning will be provided hereinafter with reference to FIG. 5.

In some embodiments, a pairing of the passive inductive unit 20 and the transceiver unit 40 can be located at a specific portion of the electrical cable 10 outside the assembly 30. The passive inductive unit 20 can be disposed adjacent to the electrical conductor 31 and enclosed by the (semi)conductive layer 35 and the insulation layer 33 of the electrical cable 10. The transceiver unit 40 can be located outside the (semi)conductive layer 35 and configured to be electromagnetically coupled with the passive inductive unit 20. A series of such pairings can be distributed along the electrical cable 10 to provide a temperature distribution of the electrical conductor 31.

Referring again to FIG. 3, the control unit 50 is configured to communicate with the transceiver unit 40 through a wire 51. The wire 51 can be accommodated within the passage 153 so that the wire 51 can extend from the transceiver unit 40, through the port 18, to the control unit 50. The optional energy harvesting unit 60 including a power inductive coil 61 can be located outside the assembly 30 and around the cable 10, or located between the second (semi)conductive layer 14 and the shrinkable sleeve layer 15. The energy harvesting unit 60 can be used to supply power to the transceiver unit 40 and/or the control unit 50 through a wire 52. Throughout this specification, although the wire 51 and the wire 52 are each referred to as a "wire," it should be understood that either or both of wire 51 and wire 52 may include multiple wires as needed for the system to function.

In some embodiments, the inductive coil 61 of the optional energy harvesting unit 60 can include, for example, one or more of an iron-core current transformer, an air-core current transformer, a Rogowski coil, etc. The inductive coil 61 can be positioned outside the first (semi)conductive layer 13, or outside the second (semi)conductive layer if one is used. Preferably, the energy harvesting unit 60 may be used mainly to provide the harvested electrical power to the transceiver unit 40, so the energy harvesting unit 60 can be positioned outside the layer in which the transceiver unit 40 is located. Thus, the energy harvesting unit 60 may be electrically connected with the transceiver unit 40 via one or more wires. In some embodiments, the energy harvesting unit 60 may further include an optional rectifier circuit to adapt the harvested electrical power right for the transceiver unit 40 and/or the control unit 50.

Figure 5:
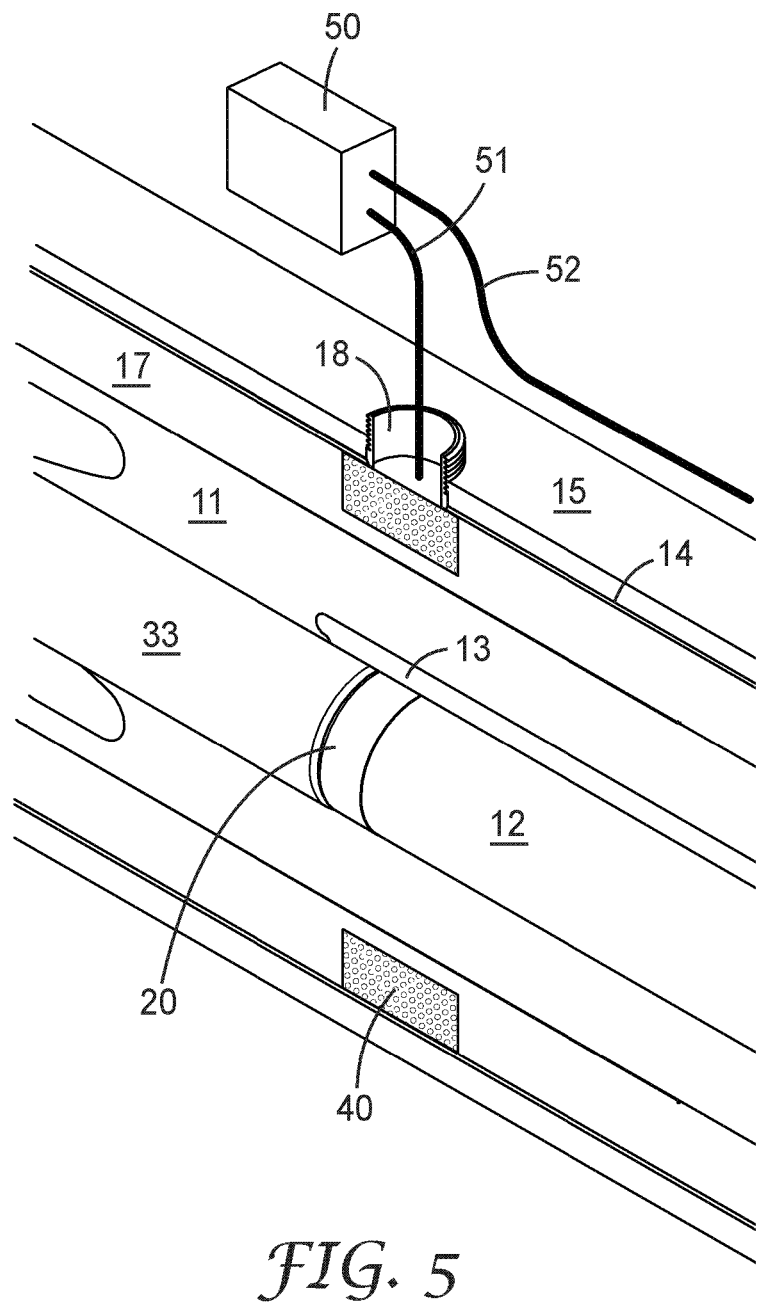
FIG. 5 is a sectional view of a portion of the electrical conductor in a cable splice assembly, for which the passive inductive unit of the system, according to one embodiment.

FIG. 5 illustrates a closer perspective view of the inductive unit 20 of FIG. 3 that is placed on the electrical conductor 31 adjacent to the connector 12. In the embodiment of FIG. 5, the shrinkable sleeve layer 15 is continuous and a hole has been cut in the shrinkable sleeve layer 15 to accommodate the port 18 and allow the egress of the wire 51.

Figure 6:
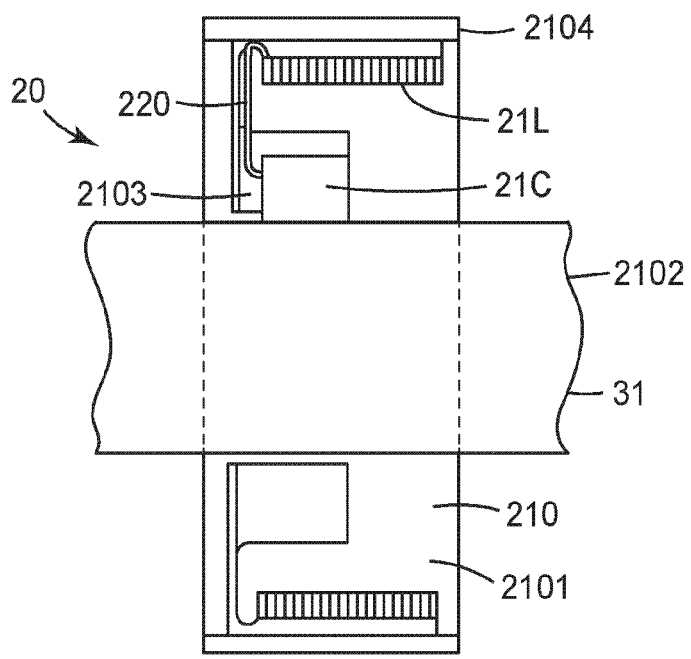
FIG. 6 is a partial cross-section side view of a portion of the cable splice assembly of FIG. 5.

FIG. 6 is an enlarged view illustrating an exemplary location of the passive inductive unit 20. As an example, the passive inductive unit 20 includes the inductor 21L and the temperature sensitive capacitor 21C which are also shown in FIG. 2. The inductor 21L and the temperature sensitive capacitor 21C are electrically connected via a wire 220. A sensor frame 210 is provided to install the inductor 21L and the temperature sensitive capacitor 21C. In the embodiment of FIG. 6, the sensor frame 210 includes an annular frame body 2101 that defines a central channel 2102.

The central channel 2102 is adapted to accommodate the electrical conductor 31 to have the electrical conductor 31 pass through the channel 2102 along an axial direction. The annular frame body 2101 has a chamber 2103 to accommodate the temperature sensitive capacitor 21C. In some embodiments, the chamber 2103 can be filled with a thermally conductive material such as, for example, a thermal epoxy. The inductor 21L is adapted to wind around the main body 2101. The sensor frame 210 further includes a cover 2104 to enclose the annular frame body 2101. It is to be understood that the sensor frame 210 may have any suitable configurations to accommodate a temperature sensor that is in direct thermal contact with the electrical conductor 31.

Some embodiments described herein provide a thermal contact member configured to enhance the thermal communication between the temperature sensitive capacitor 21C received by the chamber 2103 and the electrical conductor 31 received by the central channel 2102. The thermal contact member described herein can have at least a portion disposed between the temperature sensitive capacitor 21C and the electrical conductor 31. At least a portion of the thermal contact member can be radially movable or compressible with respect to the sensor frame 210, which allows the channel 2102 to accommodate electrical conductors having different sizes. In practical use, the electrical conductors may have a size or diameter varying from vendor to vendor. Such variance of diameter may be up to, for example, several millimeters or even several centimeters. When the diameter of an electrical conductor is smaller than the diameter of the central channel 2102 of the sensor frame 210, one or more air gaps can be present between the electrical conductor and the temperature sensor (e.g., the temperature sensitive capacitor 21C) or between the electrical conductor and the inner wall of the sensor frame.

The air gap(s) can introduce thermal delay such that the temperature sensor cannot follow the temperature change of the electrical conductor and the temperature of the electrical conductor may not be accurately measured in real time. In a typical splice environment, where there is little or no airflow inside of the splice, an air gap of 1 to 3 mm may correlate to a long-time temperature thermal delay, for example, measured in tens of minutes to hours. In addition, the thermal delay may render the temperature sensor unable to measure small temperature changes which could be indicative of early stress/wear on the electrical cable system. The thermal contact member described herein can effectively reduce such thermal delay, enhance thermal communication between an electrical conductor and a temperature sensor, provide real-time temperature measurement, and improve the accuracy of temperature measurement for the electrical conductor.

In some embodiments, the thermal contact member can be pressed directly against the outer surface of the electrical conductor 31 to achieve precise, direct surface contacts. The thermal contact members can be made of thermal diffusive or conductive materials and thus enhance thermal communication therebetween. In this manner, a temperature sensor (e.g., the temperature sensitive capacitor 21C) can follow the temperature change of the electrical conductor 31 in real time (e.g., within a few minutes, one minute, a few seconds, or even shorter time periods).

In some embodiments, the thermal contact member can be made of a material having a thermal conductivity, for example, no less than 10 W/(m·K), and a thermal diffusivity, for example, no less than 1 mm$^2$/s. The term "thermal conductivity" refers to the capability of heat transfer of a material in a steady state. The term "thermal diffusivity" refers to the ability of a material to conduct thermal energy relative to its ability to store thermal energy in a transient state. Thermal properties of some exemplary materials are listed in Table 1 below.

TABLE 1

| Materials | thermal conductivity (W/m-K) | specific heat (J/kg-K) | density (Kg/m$^3$) | Thermal Diffusivity (mm$^2$/s) |
| --- | --- | --- | --- | --- |
| Air | 0.0263 | 1005 | 1.225 | 21.36 |
| PTFE | 0.25 | 970 | 2200 | 0.12 |
| Copper | 400 | 385 | 8700 | 119.42 |

In the embodiments shown in FIGS. 7A-D, the thermal contact member includes one or more spring clips 70. The spring clips 70 are attached to an inner surface 212 of the sensor frame 210 that defines the central channel 2102. The spring clips 70 can be made of elastic, thermally conductive materials such as, for example, metals.

The sensor frame 210 is configured as a housing to receive a temperature sensor which includes, in this embodiment, the inductor 21L and the temperature sensitive capacitor 21C. In some embodiments, the portion of the sensor frame 210 surrounding the temperature sensitive capacitor 21C can be made of suitable thermally diffusive and electrically insulating materials such as, for example, thermally conductive plastics having a thermal conductivity of 0.1 to 20 W/(m·K). In some embodiments, the majority of the sensor frame 210 can be made of thermally insulating materials to reduce a thermal mass thereof such that the local temperature of the electrical conductor 31 may not be significantly changed upon contacting the sensor frame 210. In some embodiments, the sensor frame can be made of a moldable polymer material such as, for example, polytetrafluoroethylene (PTFE), nylon, polycarbonate, etc.

In the embodiments of FIGS. 7A-D, at least one of the spring clips 70 is positioned adjacent the chamber 2013 that receives the temperature sensitive capacitor 21C. The spring clip 70 and the capacitor 21C is separated by a side wall 214 of the sensor frame 210 (see FIG. 7B). As described above, the side wall 214 can be made of a thermally diffusive and/or electrically insulating material. The spring clips 70 can have various shapes and configurations that are compressible or movable along a radial direction substantially perpendicular to the inner surface 212 of the sensor frame 210. FIGS. 7A-D illustrate exemplary spring clips 70. The spring clips 70 of FIG. 7A each have two ends fixed to the inner surface 212 of the sensor frame 210 and a bulged portion between the ends configured to press directly against the outer surface of the electrical conductor 31. The spring clips 70 of FIG. 7D have a similar configuration as in FIG. 7A. The spring clips 70 of FIG. 7B each have a fixed portion attached to the inner surface 212 of the sensor frame 210 and a folded portion configured to press against the outer surface of the electrical conductor 31. The spring clips 70 of FIG. 7C each have a fixed portion attached to the inner surface 212 of the sensor frame 210 and a tilted portion configured to press against the outer surface of the electrical conductor 31.

While spring clips are shown in FIGS. 7A-D as exemplary embodiments of a thermal contact member, it is to be understood that any suitable thermal conductive structures that are radially compressible, deformable, pressable, or movable can be used to as a thermal contact member. Other exemplary thermal conductive structures can include, for example, compressible O-ring, compressible bushing, etc.

Figure 7A:
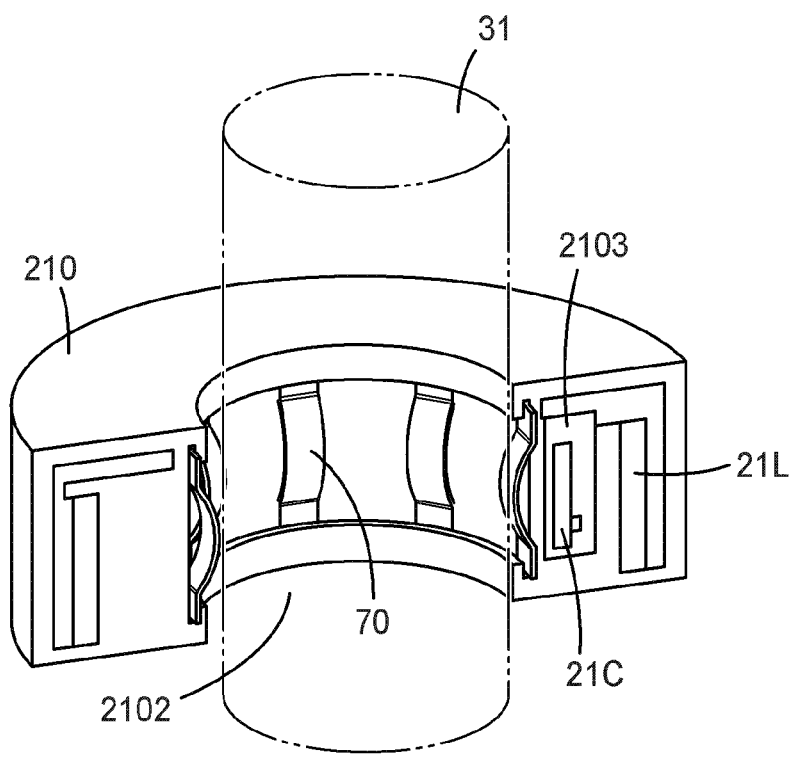
FIG. 7A is a cross-section perspective view of a temperature-sensing apparatus, according to one embodiment.
Figure 7B:
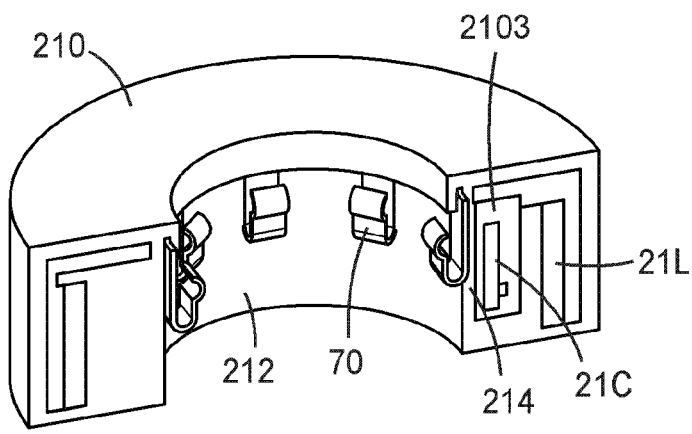
FIG. 7B is a cross-section perspective view of a temperature-sensing apparatus, according to another embodiment.
Figure 7C:
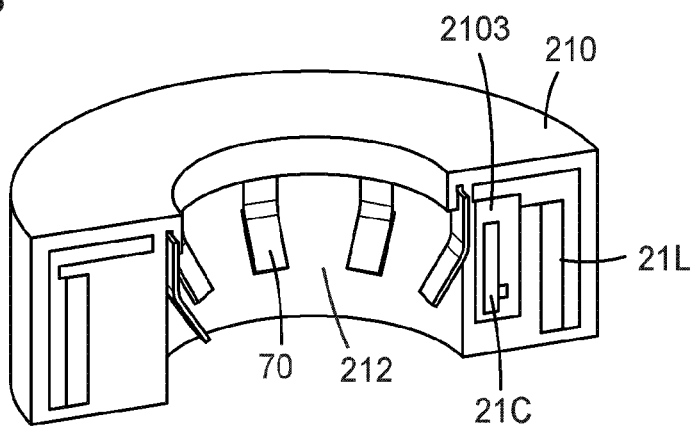
FIG. 7C is a cross-section perspective view of a temperature-sensing apparatus, according to another embodiment.
Figure 7D:
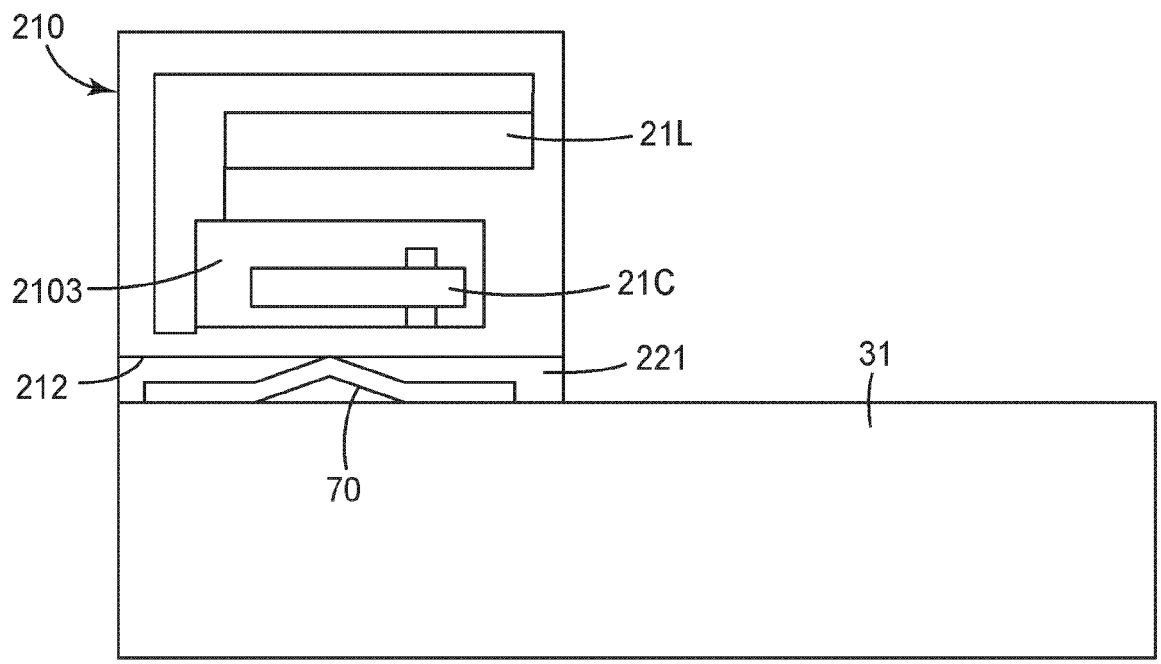
FIG. 7D is a cross-section view of the temperature-sensing apparatus of FIG. 7A.

In some embodiments, the space 221 adjacent the temperature sensitive capacitor 21C and between the outer surface of the electrical conductor 31 and the inner surface 212 of the sensor frame 210 as shown in FIG. 7D can be filled with a flowable or curable, thermally conductive material such as, for example, a thermal epoxy. For example, a pouch or bag can be welded or sealed to the sensor frame 210 and filled with thermal epoxy. When the bag is squeezed during assembling of the sensor frame onto the electrical conductor, the thermal epoxy in the bag can burst and squeeze into the space to fill.

Figure 8A:
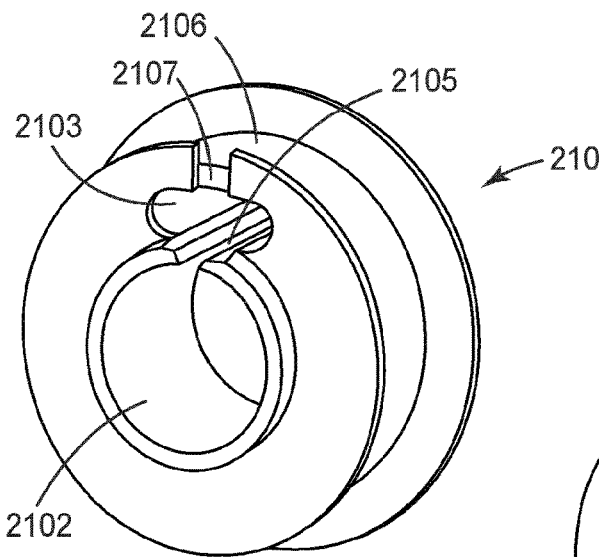
FIG. 8A is a perspective side view of a sensor frame, according to one embodiment.
Figure 8B:
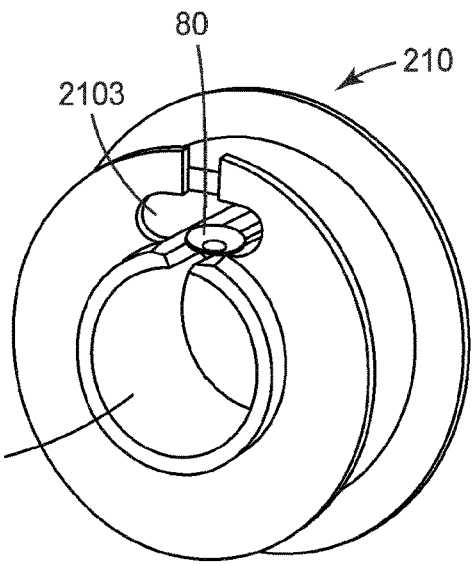
FIG. 8B is a perspective side view of the sensor frame of FIG. 8A with a thermal contact member, according to one embodiment.
Figure 8C:
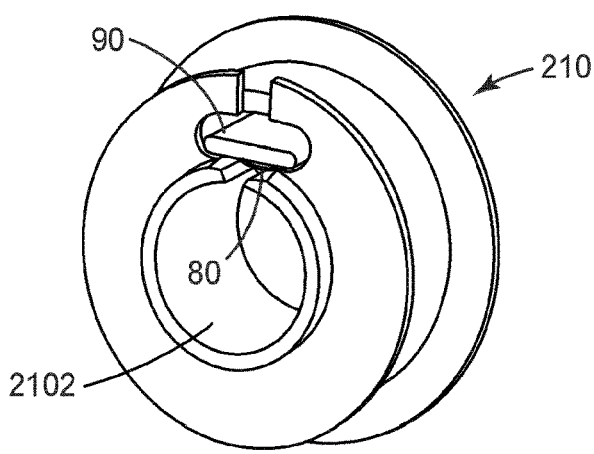
FIG. 8C is a perspective side view of the sensor frame of FIG. 8B with the thermal contact and a temperature sensor assembled, according to one embodiment.
Figure 8D:
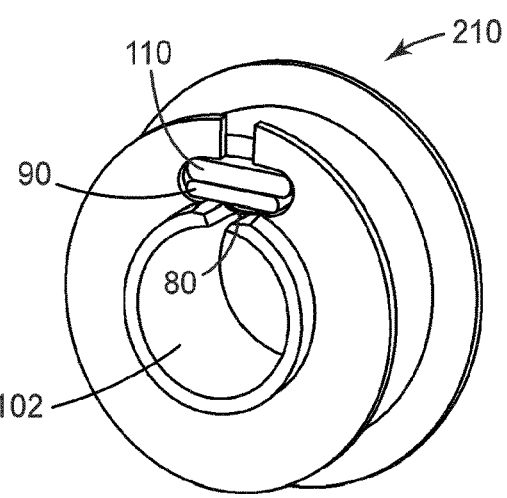
FIG. 8D is a perspective side view of the sensor frame of FIG. 8C with the thermal contact the temperature sensor, and a spring member assembled, according to one embodiment.
Figure 9:
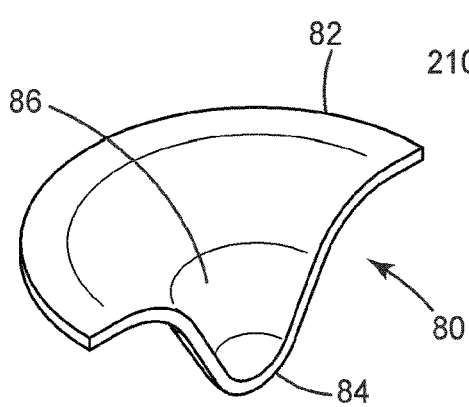
FIG. 9 is a cross-section view of the thermal contact member of FIG. 8B, according to one embodiment.

FIGS. 8A-D illustrate exemplary thermal contact members, according to another embodiment. The sensor frame 210 defines the chamber 2103 to receive a thermal contact element 80, and a ring groove 2106 to receive an inductor that can be an inductor coil positioned around the sensor frame 210. The chamber 2013 has an opening 2105 leading to the central channel 2102, and another opening 2107 leading to the ring groove 2106. FIG. 9 illustrates a cross-section side view of the thermal contact element 80 where half of the thermal contact element 80 is shown. The thermal contact member 80 includes a base plate 82 and a protrusion 84 projecting away from the base plate 82. In the depicted embodiment, a circuit board 90 including a temperature sensitive capacitor as shown in FIGS. 10A-B is attached to the base plate 82.

In some embodiments, the thermal contact member 80 can be conveniently made by punching a plate from one side to form a recess or pocket 86 on that side and the protrusion 84 on the other side. In some embodiments, the recess 86 can be filled with a thermally conductive material such as, for example, a thermal epoxy.

In some embodiments, the thermal contact member 80 as a whole can be made of thermally conductive ceramic, and the circuit board 90 can be directly attached to the thermal contact member 80. The thermally conductive ceramic can include, for example, aluminum nitride, a machinable ceramic from which the shape can be made by tuning machines, etc. The thermally conductive ceramic can have a thermal conductivity in a range, for example, from about 0.1 W/(m·K) to about 200 W/(m·K). In some embodiments, the thermal contact member 80 as a whole can be made of metal, and an electrical insulating layer can be disposed between the thermal contact member 80 and the circuit board 90. The metal can include, for example, copper, aluminum, etc., with a thermal conductivity in a range, for example, from about 100 W/(m·K) to about 500 W/(m·K). In some embodiments, one of the base plate 82 and the protrusion 84 can be made of metal, and the other of the base plate 82 and the protrusion 84 can be made of thermally conductive ceramic.

Referring again to FIGS. 8A-D and 9, the thermal contact member 80 is received by the chamber 2013 of the sensor frame 210 with the protrusion 84 projecting through the opening 2105 into the central channel 2102. With the circuit board 90 attached to the base plate 82 of the thermal contact member 80, a spring member 110 is disposed above the circuit board 90 to press the circuit board 90 and the thermal contact member 80 in a centripetal direction such that the protrusion 84 of the thermal contact member 80 can be in direct contact with the outer surface of an electrical conductor received in the channel 2102.

FIGS. 10A-B illustrate the exemplary circuit board 90 that includes the temperature sensitive capacitor 21C. The circuit board 90 has a multilayer structure including a flame retardant (FR) layer 92, a trace layer 94, an electrically insulating layer 96, and an electrically conductive layer 98. The trace layer 94, the electrically insulating layer 96, and the electrically conductive layer 98 can be conveniently referred to as an aluminum base. The FR layer 92 has a recess or pocket 922 to receive the capacitor 21C. In some embodiments, the FR layer 92 can be made of a composite material including, for example, woven fiberglass cloth with an epoxy resin binder. The top of the capacitor 21C can be lower than the top of the FR layer 92 to protect the capacitor 21C from possible short circuit issues. The capacitor 21C can be electrically connected to an inductor (e.g., the inductor 21L of FIG. 6) received by the ring groove 2106 via electrically conductive traces of the trace layer 94 and the conductive wires 220 to form an LC loop. The conductive wires 220 can extend through the opening 2107 to electrically connect the capacitor 21C and the inductor. It is to be understood that the circuit board 90 can have any suitable structures or configurations as long as the circuit board can provide mechanical support and electrical connections for the capacitor 21C.

The circuit board 90 can be attached to the thermal contact member 80. In some embodiments, a first side 921 of the circuit board 90 can be directly attached to the base plate 82 of the thermal contact member 80. In some embodiments, a second side 923 of the circuit board 90 can be directly attached to the base plate 82 of the thermal contact member 80. In some embodiments, an optional electrically insulating tape can be positioned between the circuit board 90 and the base plate 82. The optional tape can include electrically insulating and thermally conductive materials such as, for example, polyimide. In some embodiments, the circuit board 90 can be bonded to the thermal contact member 80 via suitable electrically insulating and thermally conductive adhesives such as, for example, a thermal epoxy.

As shown in FIG. 11, with the circuit board 90 attached to the thermal contact member 80, the spring member 110 is configured to press against the thermal contact member 80 such that the thermal contact member 80 is radially movable back and forth along the radial direction indicated by the arrow 9. This allows the protrusion 84 to project through the opening 2105 and be in direct contact with electrical conductors having varying sizes. It is to be understood that the spring member 110 can press against the circuit board 90 to move the thermal contact member 80. Such radial movement of the thermal contact member 80 allows electrical conductors with different sizes to be in good thermal contact with the protrusion 84 of the thermal contact member 80. In some embodiments such as shown in FIG. 12, the circuit board 90 as a whole can be received by a pocket of on the rear side of the thermal contact member 80. It is to be understood that the thermal contact member 80 may not be rigidly fixed to the inner walls of the chamber 2103, which may impede the radial movement. Additional spring members or compressible members can be used along with the spring member 110 to make the thermal contact member 80 elastically movable along the radial direction.

Some embodiments described above provide thermal contact members to effectively reduce thermal delay between a temperature sensitive capacitor and an electrical conductor, and thus enhance thermal communication therebetween. It is to be understood that the above thermal contact members can be applied to enhance thermal communication between the electrical conductor and any temperature sensitive components of a temperature sensor. For example, in some embodiments, the thermal contact members can be applied to enhance thermal communication between a temperature sensitive inductor and the electrical conductor.

The present disclosure provides a temperature-sensing apparatus including one or more thermal contact members that are radially movable or compressible, which allows the temperature-sensing apparatus to be applicable to various electrical conductors with different sizes or diameters. The thermal contact member can effectively reduce thermal delay between the electrical electrode and the temperature sensor, and provide more robust, accurate, and reliable temperature measurement for electrical conductors in real time.

LISTING OF EXEMPLARY EMBODIMENTS

Exemplary embodiments are listed below.
Embodiment 1 is a temperature-sensing apparatus for sensing a temperature of an electrical conductor, the apparatus comprising:
a sensor frame including a frame body and a channel adapted to accommodate the electrical conductor elongated along an axial direction, the frame body including a chamber adjacent the electrical conductor;
a temperature sensor, at least a portion of the temperature sensor being received in the chamber of the sensor frame; and
a thermal contact member, at least a portion of the thermal contact member being disposed between the electrical conductor and the temperature sensor and configured to enhance thermal communication therebetween,
wherein at least a portion of the thermal contact member is configured to be radially pressable against an outer surface of the electrical conductor.

Embodiment 2 is the apparatus of embodiment 1, wherein the temperature sensor includes at least one temperature sensitive capacitor.

Embodiment 3 is the apparatus of embodiment 1 or 2, wherein the sensor frame has an annular shape and the channel is a central channel.

Embodiment 4 is the apparatus of any one of embodiments 1-3, wherein at least a portion of the sensor frame adjacent the temperature sensor is made of a thermally conductive polymer material.

Embodiment 5 is the apparatus of any one of embodiments 1-4, wherein the thermal contact member includes one or more spring clips attached to an inner surface of the frame body.

Embodiment 6 is the apparatus of embodiment 5, wherein at least one of the spring clips includes a first portion being fixed to an inner wall of the chamber and a second portion being radially compressible and configured to be in direct contact with the electrical conductor.

Embodiment 7 is the apparatus of embodiment 5 or 6, wherein at least one of the spring clips is disposed adjacent the chamber.

Embodiment 8 is the apparatus of any one of embodiments 1-7, wherein the thermal contact member includes a thermal contact body received by the chamber and a protrusion connected to the thermal contact body, the protrusion projects through an opening of the chamber into the channel, and is adapted to be in direct contact with the outer surface of the electrical conductor.

Embodiment 9 is the apparatus of embodiments 8, wherein the thermal contact body and the protrusion are formed by punching a plate from a first side thereof to form a pocket on the first side and the protrusion on a second, opposite side.

Embodiment 10 is the apparatus of embodiment 8 or 9, wherein the thermal contact body and the projection are made of one or more thermal-conductive materials.

Embodiment 11 is the apparatus of embodiment 10, wherein the thermal-conductive materials include at least one of thermally conductive ceramic and metal.

Embodiment 12 is the apparatus of embodiment 10 or 11, wherein the thermal-conductive materials have a thermal conductivity no less than about 10 W/(m·K).

Embodiment 13 is the apparatus of any one of embodiments 8-12, further comprising a spring member pressing at least one of the thermal contact member and the temperature sensor against the outer surface of the electrical conductor.

Embodiment 14 is the apparatus of any one of embodiments 8-13, wherein the temperature sensor is bonded to a major surface of the thermal contact member via a thermal adhesive.

Embodiment 15 is the apparatus of any one of embodiments 8-14, further comprising an electrically insulating layer disposed between the thermal contact member and the temperature sensor.

Embodiment 16 is the apparatus of any one of embodiments 8-15, wherein the thermal contact body includes a pocket to receive the temperature sensor.

Embodiment 17 is the apparatus of any one of embodiments 1-16, further comprising a circuit board including a groove on a major surface thereof to receive the temperature sensor.

Embodiment 18 is the apparatus of embodiment 17, wherein the circuit board has a multilayer structure including a flame retardant (FR) layer, a trace layer, an electrically insulating layer, and an electrically conductive layer, and the groove is formed in the FR layer.

Embodiment 19 is an electrical cable assembly comprising:
an electrical conductor enclosed in a (semi)conductive layer; and
one or more of the temperature-sensing apparatuses of any one of the preceding embodiments,
wherein the temperature-sensing apparatuses are distributed along the electrical conductor and configured to sense a temperature distribution of the electrical conductor.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

EXAMPLES

Example 1 and Comparative Example C1

Example 1 was fabricated for sensing a temperature of an electrical conductor (e.g., the electrical conductor 31 of FIG. 1). The temperature sensing apparatus had a configuration as shown in FIG. 7A. The sensor frame was made of a thermally conductive plastic available from Celanese (Irving, Tex.) under the trade designation CoolPoly. Eight metal spring clips were mounted on the inner surface of the sensor frame, making contact with the electrical conductor. The chamber 2103 was filled with a thermal epoxy available from 3M Company (St. Paul, Minn.). Comparative Example C1 was the same as Example 1 except that no spring clips were used, the chamber 2103 was not filled with air (not epoxy), and the sensor frame 210 was made of PTFE plastic.

Figure 13:
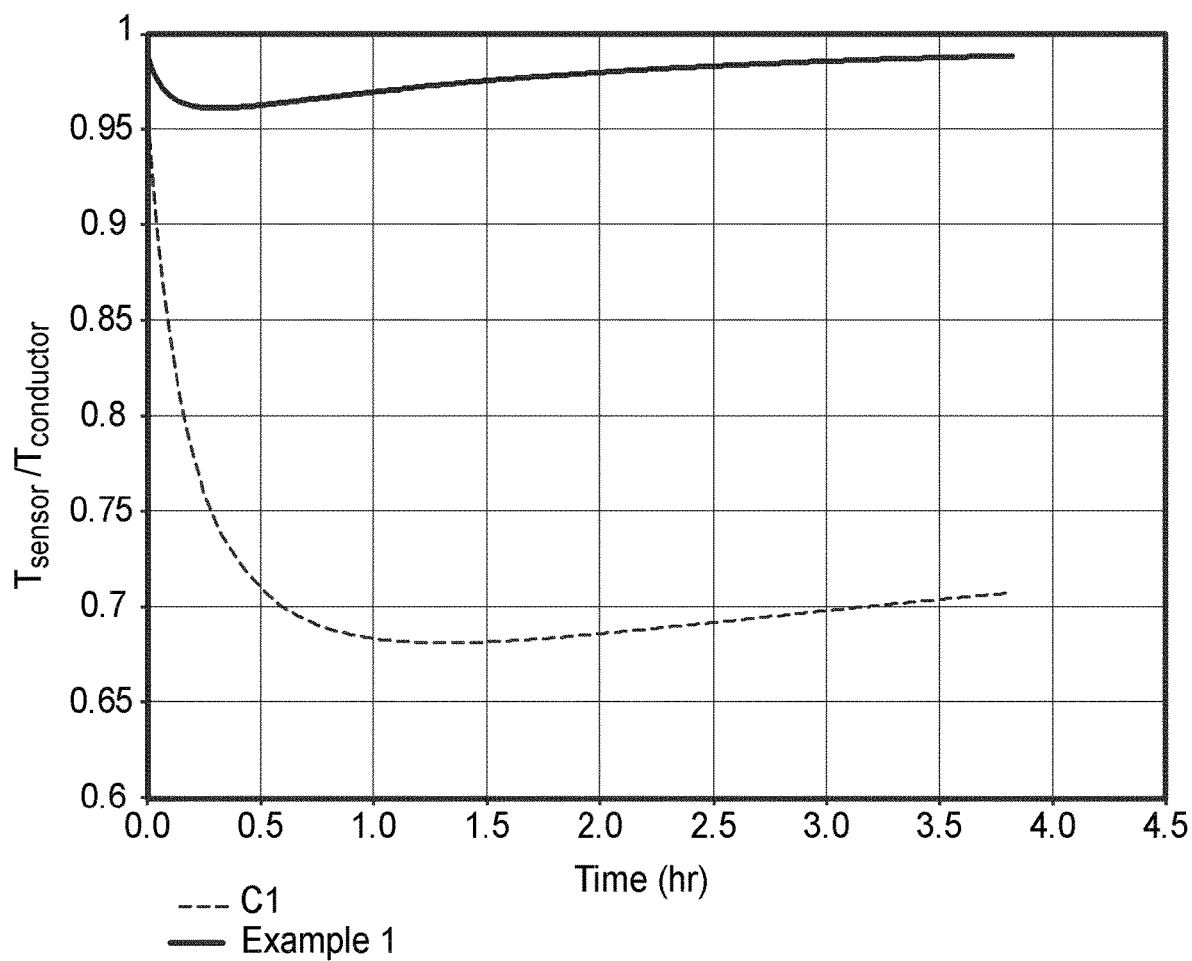
FIG. 13 illustrates curves for ratios of the sensor temperature and the conductor temperature for Example 1 and Comparative Example C1.

Transient thermal analyses were performed to compare the thermal response of Example 1 and Comparative Example C1. The ratios of the sensor temperature and conductor temperature were plotted as in FIG. 13. For Example 1, the temperature of the temperature sensing apparatus closely followed the temperature of the electrical conductor (i.e., the ratio Tsensor/Tconductor close to 1), while Comparative Example C1 had a significantly larger temperature deviation (i.e., the ratio Tsensor/Tconductor not close to 1).

Example 2 and Comparative Example C2

Example 2 was fabricated for sensing a temperature of an electrical conductor (e.g., the electrical conductor 31 of FIG. 1). The temperature sensing apparatus had a configuration as shown in FIG. 8D. The sensor frame was made of polytetrafluoroethylene (PTFE). The thermal contact member 80 was made by punching a copper plate. Comparative Example C2 was the same as Example 2 except that no thermal contact member 80 was used for Comparative Example C2. Heat transfer between the electrical conductor and the temperature sensing apparatus was evaluated by numerical simulations and the results were similar as in FIG. 13. For Example 2, the temperature of the temperature sensing apparatus closely followed the temperature of the electrical conductor (i.e., the ratio $T_{sensor}/T_{conductor}$ close to 1).

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A temperature-sensing apparatus for sensing a temperature of an electrical conductor, the apparatus comprising:
a sensor frame including a frame body and a channel adapted to accommodate the electrical conductor along an axial direction, the frame body including a chamber adjacent the electrical conductor;
a temperature sensor, at least a portion of the temperature sensor disposed in the chamber of the sensor frame; and
a thermal contact member, at least a portion of the thermal contact member being disposed between the electrical conductor and the temperature sensor and configured to enhance thermal communication therebetween,
wherein at least a portion of the thermal contact member is configured to be radially pressable against an outer surface of the electrical conductor,
wherein the thermal contact member includes one or more spring clips attached to an inner surface of the frame body, and
wherein at least one of the spring clips includes a first portion being fixed to an inner wall of the chamber and a second portion being radially compressible and configured to be in direct contact with the electrical conductor.

2. The apparatus of claim 1, wherein the temperature sensor includes at least one temperature sensitive capacitor.

3. The apparatus of claim 1, wherein the sensor frame has an annular shape and the channel is a central channel.

4. The apparatus of claim 1, wherein at least a portion of the sensor frame adjacent the temperature sensor is made of a thermally conductive polymer material.

5. The apparatus of claim 1, wherein at least one of the spring clips is disposed adjacent the chamber.

6. The apparatus of claim 1, further comprising a circuit board including a groove on a first surface thereof to receive the temperature sensor.

7. A temperature-sensing apparatus for sensing a temperature of an electrical conductor, the apparatus comprising:

a sensor frame including a frame body and a channel adapted to accommodate the electrical conductor along an axial direction, the frame body including a chamber adjacent the electrical conductor;
a temperature sensor, at least a portion of the temperature sensor disposed in the chamber of the sensor frame; and
a thermal contact member, at least a portion of the thermal contact member being disposed between the electrical conductor and the temperature sensor and configured to enhance thermal communication therebetween,
wherein at least a portion of the thermal contact member is configured to be radially pressable against an outer surface of the electrical conductor,
wherein the thermal contact member includes a thermal contact body received by the chamber and a protrusion connected to the thermal contact body, the protrusion projects through an opening of the chamber into the channel, and is adapted to be in direct contact with the outer surface of the electrical conductor, and wherein the thermal contact body and the protrusion are formed by punching a plate from a first side thereof to form a pocket on the first side and the protrusion on a second, opposite side.

8. The apparatus of claim 7, wherein the thermal contact body and the projection are made of one or more thermal-conductive materials.

9. The apparatus of claim 8, wherein the thermal-conductive materials include at least one of thermally conductive ceramic and metal.

10. The apparatus of claim 8, wherein the thermal-conductive materials have a thermal conductivity no less than about 10 W/(m·K).

11. The apparatus of claim 7, further comprising a spring member contacting both the temperature sensor and the outer surface of the electrical conductor.

12. The apparatus of claim 7, wherein the temperature sensor is bonded to a first surface of the thermal contact member via a thermal adhesive.

13. The apparatus of claim 7, further comprising an electrically insulating layer disposed between the thermal contact member and the temperature sensor.

14. The apparatus of claim 7, wherein the thermal contact body includes a pocket to receive the temperature sensor.

* * * * *